(12) United States Patent
Wang

(10) Patent No.: US 11,654,345 B2
(45) Date of Patent: May 23, 2023

(54) PORTABLE ENERGY-SAVING AND ENVIRONMENT-FRIENDLY ELECTRIC VEHICLE

(71) Applicant: Zhenkun Wang, Marblehead, MA (US)

(72) Inventor: Zhenkun Wang, Marblehead, MA (US)

(\*) Notice: Subject to any disclaimer, the term of this patent is extended or adjusted under 35 U.S.C. 154(b) by 0 days.

(21) Appl. No.: 17/519,910

(22) Filed: Nov. 5, 2021

(65) Prior Publication Data

US 2022/0409983 A1    Dec. 29, 2022

(30) Foreign Application Priority Data

Jun. 25, 2021 (CN) .......................... 202121434727.2

(51) Int. Cl.
*A63C 17/12*      (2006.01)
*B60L 50/60*      (2019.01)
(Continued)

(52) U.S. Cl.
CPC ............ *A63C 17/12* (2013.01); *A63C 17/002* (2013.01); *A63C 17/011* (2013.01); *A63C 17/26* (2013.01); *B60L 50/60* (2019.02); *B60L 53/50* (2019.02); *B60L 53/62* (2019.02); *H02K 7/1853* (2013.01); *H02K 11/0094* (2013.01); *A63C 2203/10* (2013.01); *A63C 2203/12* (2013.01); *B60L 2200/24* (2013.01)

(58) Field of Classification Search
CPC ..... A63C 17/12; A63C 17/002; A63C 17/011; A63C 17/26; A63C 2203/10; A63C 2203/12; A63C 2203/00; B60L 50/60; B60L 53/50; B60L 53/62; B60L 2200/24; H02K 7/1853; H02K 11/0094
See application file for complete search history.

(56) References Cited

U.S. PATENT DOCUMENTS 3,862,764 A  \*   1/1975   Hartz ....................... A63C 5/16
                                                                      280/818
7,382,104 B2 \*   6/2008   Jacobson ............. A01D 34/902
                                                                   30/296.1
(Continued)

FOREIGN PATENT DOCUMENTS

CN           204336145 U    \*   5/2015
CN           106143754 A    \*   11/2016
(Continued)

*Primary Examiner* — James A Shriver, II
*Assistant Examiner* — Michael T. Walsh
(74) *Attorney, Agent, or Firm* — WPAT, PC

(57) ABSTRACT

A portable energy-saving and environment-friendly electric vehicle is light in weight, small in volume, convenient in electricity charging, and can be disassembled for portability in a backpack. The backpack is further furnished with a crank-handle generator to enable manpower electricity generation and working out simultaneously. This energy-saving and environment-friendly electric vehicle is mainly comprised of two adjustable skateboards and a support rod for adjusting speed and connecting a battery set. The battery set can be conveniently replaced roadside or at other locations. In a situation of power loss, manpower can be used to charge the battery set. Thus, the situation of power loss fully disabling the electric vehicle can be met. In addition, the battery set associated with the generator is reliable for charging mobile phones and computers.

17 Claims, 6 Drawing Sheets

(51) Int. Cl.
  *B60L 53/62* (2019.01)
  *B60L 53/50* (2019.01)
  *A63C 17/01* (2006.01)
  *A63C 17/26* (2006.01)
  *H02K 7/18* (2006.01)
  *H02K 11/00* (2016.01)
  *A63C 17/00* (2006.01)

(56) References Cited

U.S. PATENT DOCUMENTS

| | | | | |
|---|---|---|---|---|
| 7,900,731 | B2 * | 3/2011 | McKinzie | A63C 17/08 |
| | | | | 180/181 |
| 9,415,294 | B2 * | 8/2016 | Pino | A45F 3/04 |
| 9,526,977 | B2 * | 12/2016 | Edney | A63C 17/04 |
| 9,592,434 | B2 * | 3/2017 | Slagter | A63C 17/0093 |
| 9,770,080 | B2 * | 9/2017 | Dourado | A45F 3/04 |
| 9,889,368 | B1 * | 2/2018 | Chen | A63C 17/045 |
| 10,780,928 | B2 * | 9/2020 | Pang | A63C 17/12 |
| 11,279,431 | B2 * | 3/2022 | Chen | B62J 43/28 |
| 11,279,432 | B2 * | 3/2022 | Chen | B62K 11/007 |
| 11,400,360 | B1 * | 8/2022 | Crockett | B62D 55/15 |
| 2003/0155726 | A1 * | 8/2003 | Braun | A63C 5/03 |
| | | | | 280/607 |
| 2005/0225042 | A1 * | 10/2005 | Liu | B62B 13/043 |
| | | | | 280/14.21 |
| 2016/0332062 | A1 * | 11/2016 | Wu | A63C 17/015 |
| 2018/0207656 | A1 * | 7/2018 | Wang | B05B 9/007 |
| 2018/0257732 | A1 * | 9/2018 | Chen | B60K 7/0007 |
| 2019/0256163 | A1 * | 8/2019 | Chen | B62K 11/007 |
| 2019/0367116 | A1 * | 12/2019 | Desberg | A63C 17/014 |
| 2022/0204113 | A1 * | 6/2022 | Wang | B62K 11/007 |

FOREIGN PATENT DOCUMENTS

| | | | | | |
|---|---|---|---|---|---|
| CN | 107018760 | A | * | 8/2017 | ........... A01D 46/264 |
| CN | 207428013 | U | * | 6/2018 | |
| DE | 2806883 | A1 | * | 8/1979 | |
| DE | 10010802 | A1 | * | 9/2001 | ............... A63C 5/02 |
| EP | 3285894 | B1 | * | 9/2020 | ........... A63C 17/002 |
| WO | WO-2012038554 | A1 | * | 3/2012 | ............. A63C 5/035 |

\* cited by examiner

PORTABLE ENERGY-SAVING AND ENVIRONMENT-FRIENDLY ELECTRIC VEHICLE

CROSS REFERENCE TO RELATED APPLICATION

This application claims the benefits of China application Serial No. 202121434727.2, filed on Jun. 25, 2021, the disclosures of which are incorporated by references herein in its entirety.

TECHNICAL FIELD

The present disclosure relates in general to a novel product in the field of energy-saving and environment-friendly vehicles and backpacks, and more particular to a portable energy-saving and environment-friendly electric vehicle.

BACKGROUND

Currently, the existing electric bicycles are large in size, heavy in weight, and inconvenient in charging; and the existing electric skateboards are limited in battery life, inconvenient in charging, and inconvenient in carrying or storing.

SUMMARY

Structure explanation: The energy-saving and environment-friendly electric vehicle of this disclosure is normally collected into a backpack. While in use, the electric vehicle is downloaded from the backpack and simply assembled into a compact applicable state.

All components of the electric vehicle of this disclosure can be disassembled and collected into the backpack for portability.

Associated batteries of the electric vehicle of this disclosure can be swiftly disassembled or assembled. An exhausted battery can be directly replaced, or human power can be introduced, to reactivate the electric vehicle. With more and more applications of this energy-saving and environmentally-friendly electric vehicle, more service sites would appear for providing battery replacement services, such as different roadside shops or even residents' houses. Thereupon, while in using the electric vehicle, no excessive time should be needed to wait for recharging the battery.

Generally, the battery set comprises two parts, one for immediate usage and another for backup usage. The battery set is also furnished with electricity display. In the case that the electricity is exhausted, the human power can be introduced to generate electricity, and thus the electric vehicle can be continuously operated without being shut down due to an exhausted battery set. Hence, the electric vehicle of this disclosure can be easily carried and reliable. Further, the style of using human power to charge the battery set can be also applied for working out in the office or while in an online job.

Two skateboards are furnished in this electric vehicle, one as a driving skateboard and another as a driven skateboard. The driving skateboard plugged by a support rod has a bottom furnished with a roller set having a front roller connected with a small generator. Such a design can reduce the total weight of the electric vehicle so as to achieve the desired portability.

For the two skateboards, the driving and driven skateboards, only the driving skateboard is furnished with a small generator, but the two skateboards can be arbitrarily collected to the backpack. Namely, no specific criterion for storage arrangement is enforced, but according to user's habit. If the user is used to have his or her right hand to hold the support rod, then the drive skateboard may be always collected in the right-hand side. On the other hand, if the user is used to have his or her left hand to hold the support rod, then the drive skateboard may be always collected in the left-hand side. As soon as the drive skateboard is collected, then an expansion link 9 is applied to connect the two skateboards. The expansion link can be used to arbitrarily adjust the order and spacing of the two skateboards according to user's habit. As such, even that each of the two skateboards is only sized for adults, the re-assembled skateboards can be stably operated.

When electricity at each part of the battery set is exhausted and no instant replacement is possible, then one of following two methods shall be performed. Method 1: Collect the drive skateboard back to the backpack, and apply only the driven skateboard via human power so as to reduce the resistance against the sliding of the electric vehicle. Method 2: Use human power to generate electricity. Namely, utilize the hand or foot power to charge the battery set through the generator.

Apply a power cable to connect electrically the battery set at the backpack with a small electric motor at the bottom of the driven skateboard. For the sake of safety and compactness, this power cable can be arranged to extend inside a sleeve of a user's clothes. While user's hand having the sleeve holds the support rod, the power cable can be pulled out of the sleeve to further connect the support rod. Then, via a wire inside the support rod, the power cable can be connected electrically with the electric motor.

Since the backpack of this disclosure can provide battery charging and manpower charging to energize mobile phones, computers and the like small electric devices, thus the situation of power loss for those small electric devices would be never met at any place or any time if such a backpack is at hand.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
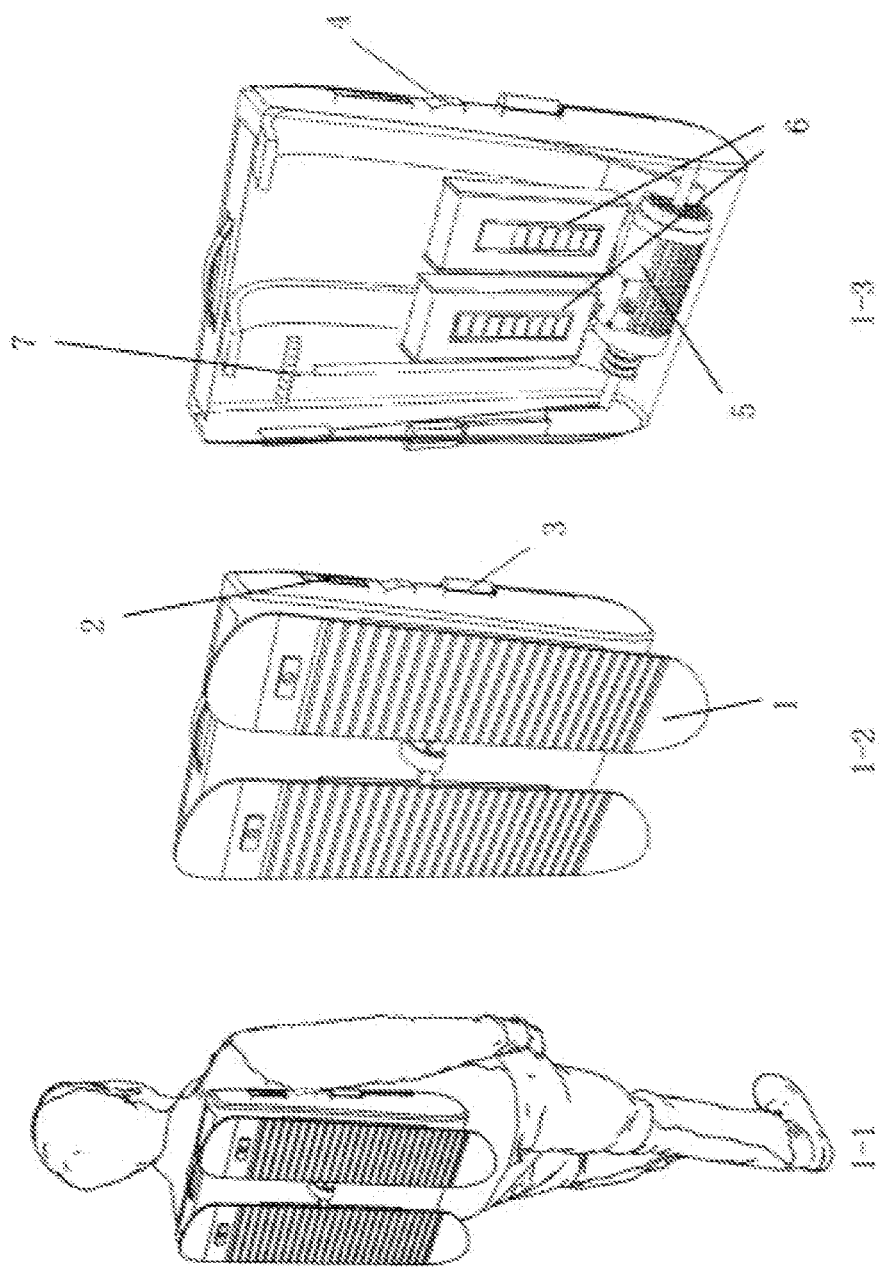
FIG. 1 (including sub-FIGS. 1-1, 1-2, and 1-3) demonstrates schematically a backpack provided with a portable energy-saving and environment-friendly electric vehicle in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in sub-FIG. 1-1, while the portable energy-saving and environment-friendly electric vehicle of this disclosure is in a storage state, it can be collected onto a backpack to fulfill an object of portability. In sub-FIG. 1-2, two skateboards 1 are hung at a back side of the backpack. On a lateral side of the backpack, an electricity indicator 2 is disposed to display instant electricity. At a lower portion of the lateral side of the backpack, a retrievable crank handle 3 for an internal generator is equipped. At a middle portion of the lateral side of the backpack, at least one charging port 4 for mobile phones or computers is provided. As shown in sub-FIG. 1-3, a telescopic support rod 7 in a storage state is collected inside the backpack. At a bottom portion of the backpack, a built-in generator 5 is located. In addition, a battery set, comprises two replaceable chargeable batteries 6, arranged inside the backpack. Upon such an arrangement, while in an outdoor activity, the portable energy-saving and environment-friendly electric vehicle of this disclosure can be easily carried along with the backpack.

Figure 2:
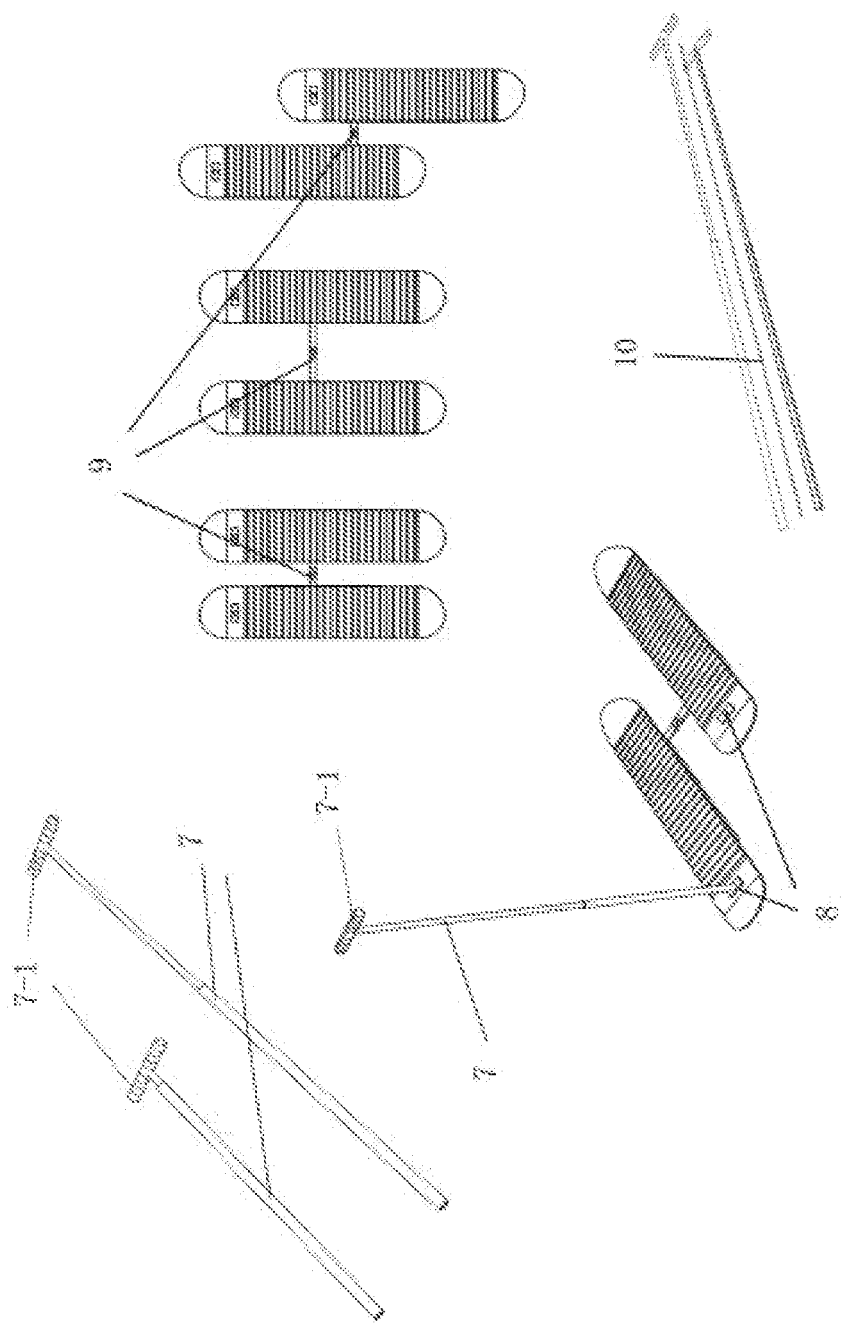
FIG. 2 demonstrates schematically the support rod and the expansion link of the portable energy-saving and environment-friendly electric vehicle skateboard of FIG. 1.

As shown in FIG. 2, a support rod 7 with an adjustable length is present. A handle 7-1 for modulating the speed of the vehicle is provided to a top of the support rod 7. By turning the handle 7-1 to control the speed of the skateboards. When the skateboards are placed on the ground, a positioning hole 8 at a front end of each of the skateboards is configured to buckle the support rod 7. According to user's preference, the support rod 7 can be positioned to the driving or driven skateboard. If a user prefers using his or her left hand, the support rod can be plugged into the positioning hole of the skateboard at the left-hand side. If a user prefers using his or her right hand, the support rod can be plugged into the positioning hole of the skateboard at the right-hand side.

An expansion link 9 able to adjust relative positioning and spacing of the two skateboards is provided between the two skateboards to meet versatile application requirements. Such a free-style connection between the two skateboards can increase stability of the skateboards, and also enable a user to arbitrarily adjust positions of the two feet so as to achieve a comfortable operation state. A power cable 10 for connecting the battery set in the backpack and the electric motor under the skateboard is arranged to penetrate thereinside through the support rod. In the case that no electric driving is required, the driving skateboard having the electric motor can be mounted to the rear side of the backpack, and the driven skateboard is left on the ground for manpower sliding.

Figure 3:
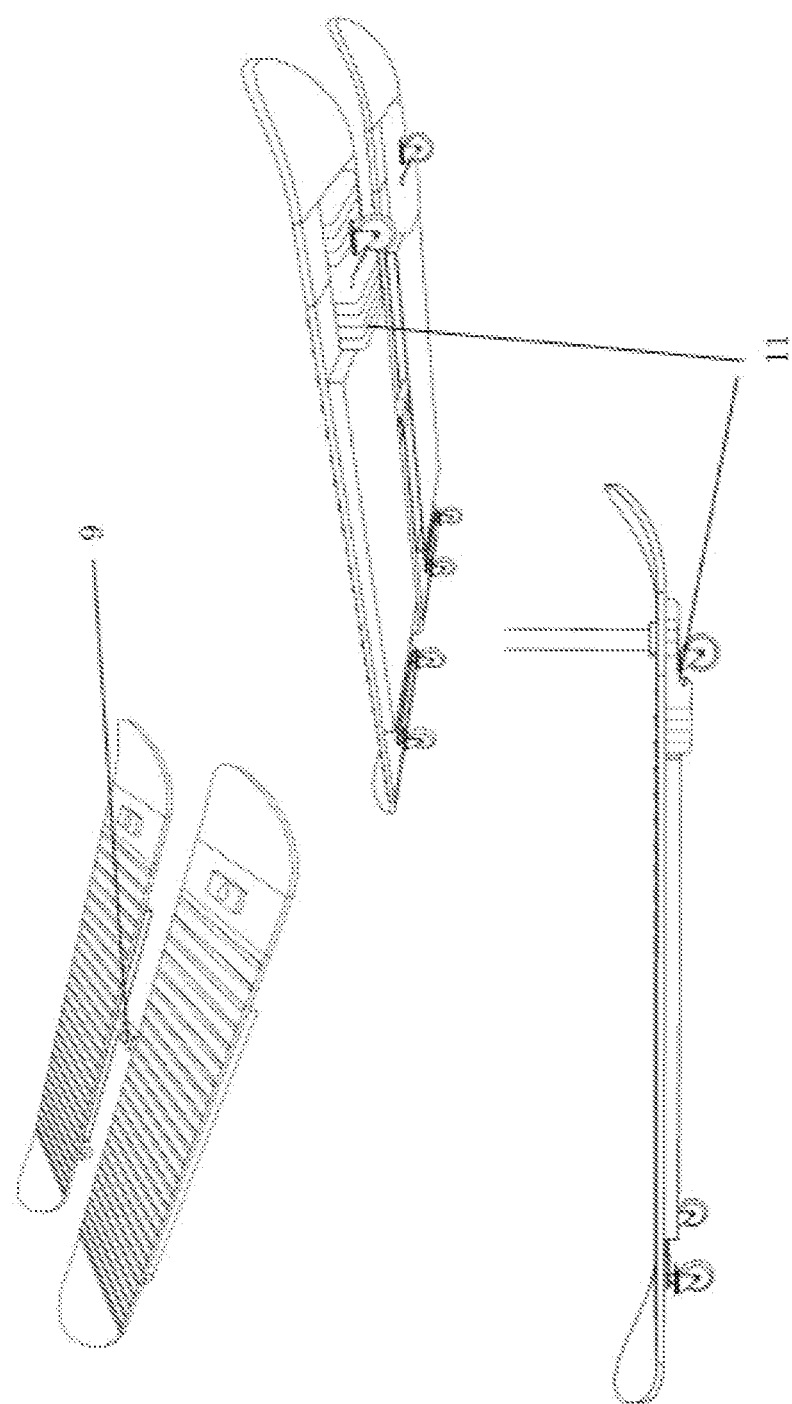
FIG. 3 demonstrates schematically the skateboards of the portable energy-saving and environment-friendly electric vehicle of FIG. 1.

As shown in FIG. 3, the expansion link 9 connected between the two skateboards enables both ends to slide along respective tracks at corresponding bottoms of the skateboards, such that the relative positions and spacing of the two skateboards can be arbitrarily adjusted to meet various user needs. Behind a front roller of the drive skateboard, a small electric motor 11 is mounted to drive the skateboards with electricity supply from the power cable penetrating the support rod 7 and the positioning hole 8.

Figure 4:
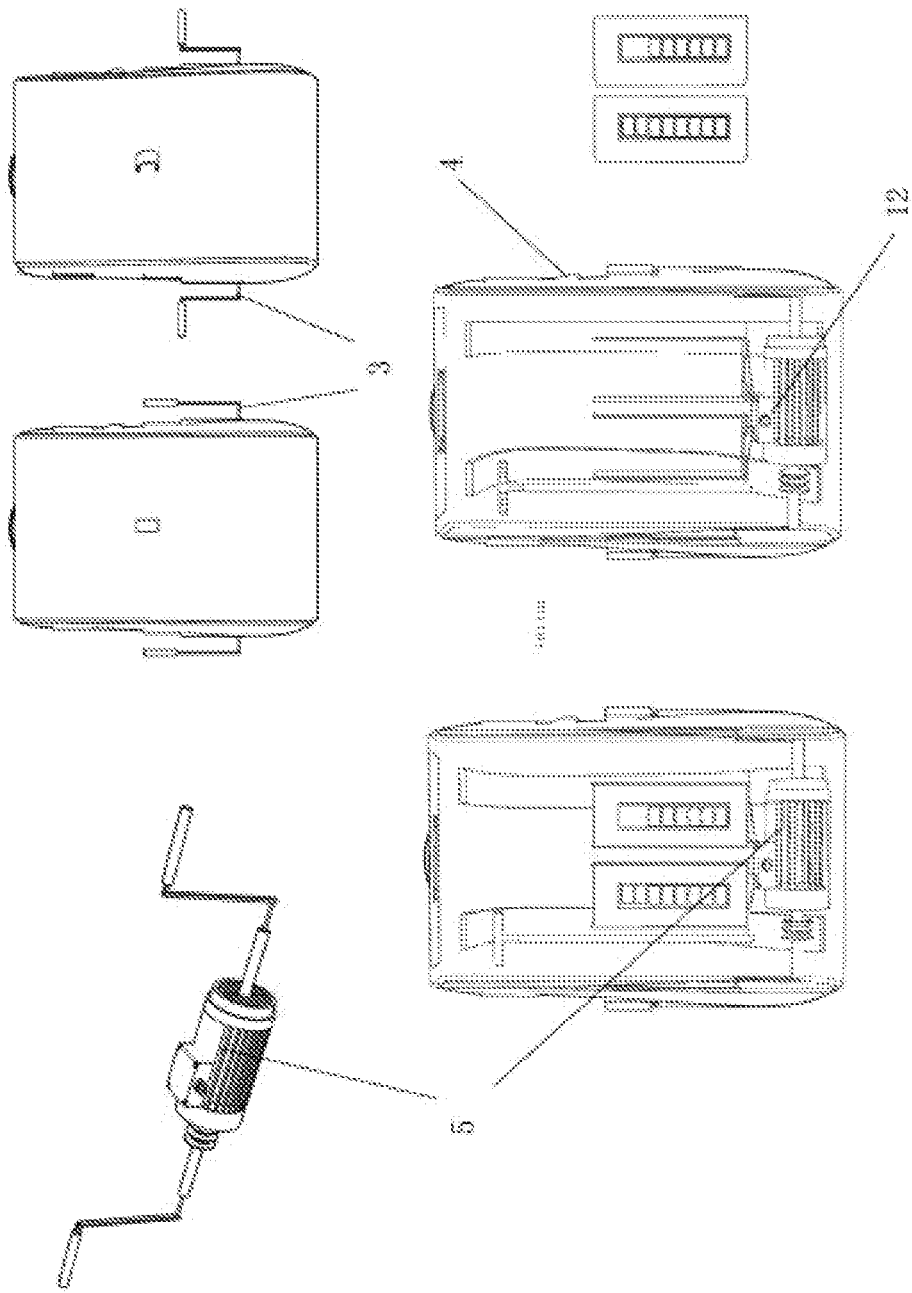
FIG. 4 demonstrates schematically the manpower generator and the crank handles of the backpack of FIG. 1.

As shown in FIG. 4, a small crank-handle generator 5 is provided at a bottom portion of the backpack. This generator 5 is electrically connected with the battery set via conductive wiring through the battery interface 12. The generator 5 is furnished with two opposite crank handles 3 extended to be disposed at opposite lateral sides of the backpack for convenient operation by hands or feet. After the battery set is disposed to connect with the battery interface, the manpower can be applied to charge the battery set via the generator. The battery set consisted of two batteries is connected with the generator via the battery interface 12. In FIG. 4, the charging port 4 is used for charging mobile phones or computers. Also, the associated charging status can be observed through the electricity indicator at the lateral side of the backpack.

Figure 5:
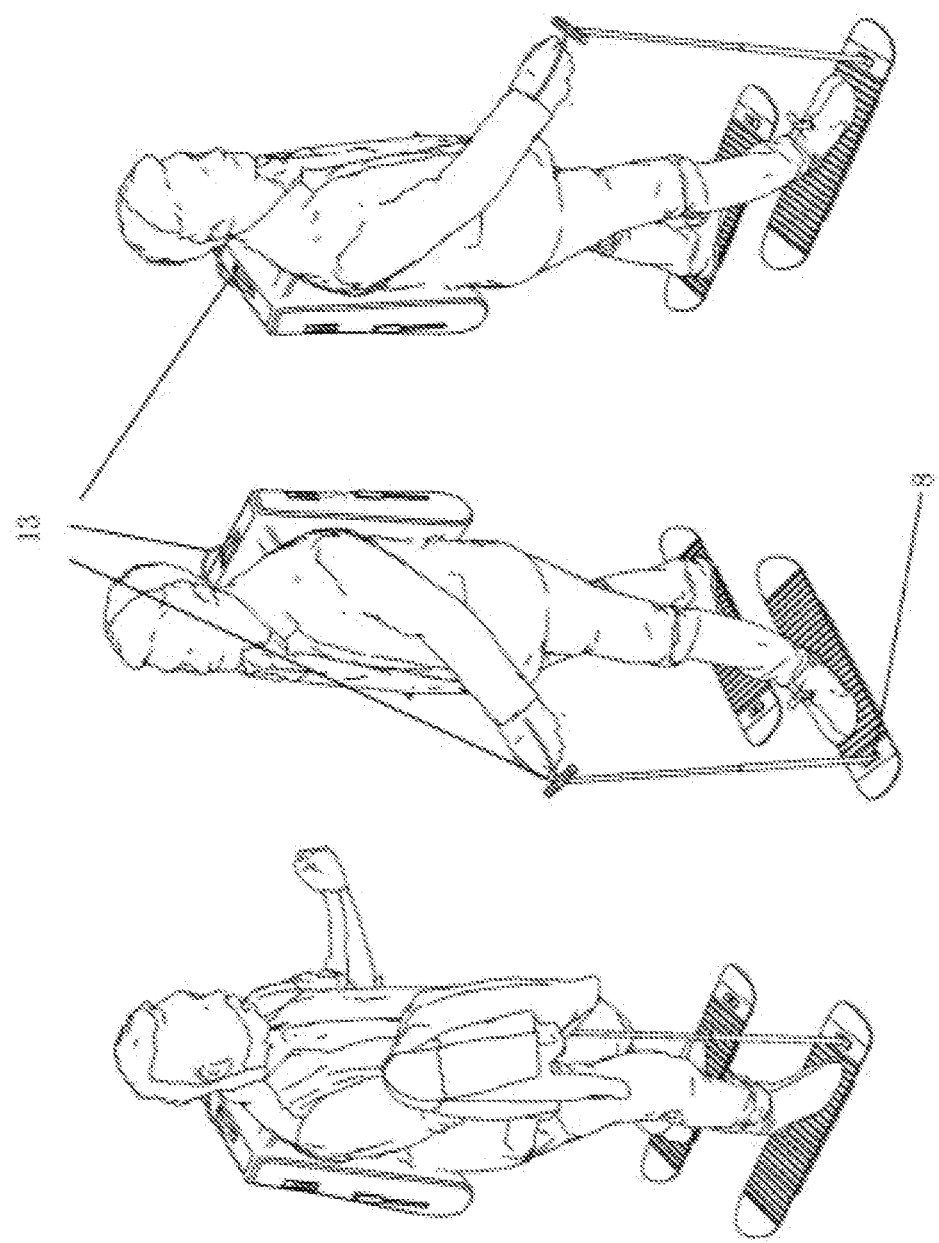
FIG. 5 demonstrates schematically an application of the portable energy-saving and environment-friendly electric vehicle of FIG. 1.

As shown in FIG. 5, an application of the portable energy-saving and environment-friendly electric vehicle of this disclosure is schematically illustrated. While in use, the support rod is plugged into the positioning hole of the drive skateboard, and then the battery set can energize the electric motor under the skateboard. For the sake of convenience and safety, the power cable 13 pulled from the backpack can be arranged to penetrate through the sleeve of the cloth, and to connect with the electric motor via the power cable 10 positioned within the support rod, such that no interference with the skateboard can occur.

Figure 6:
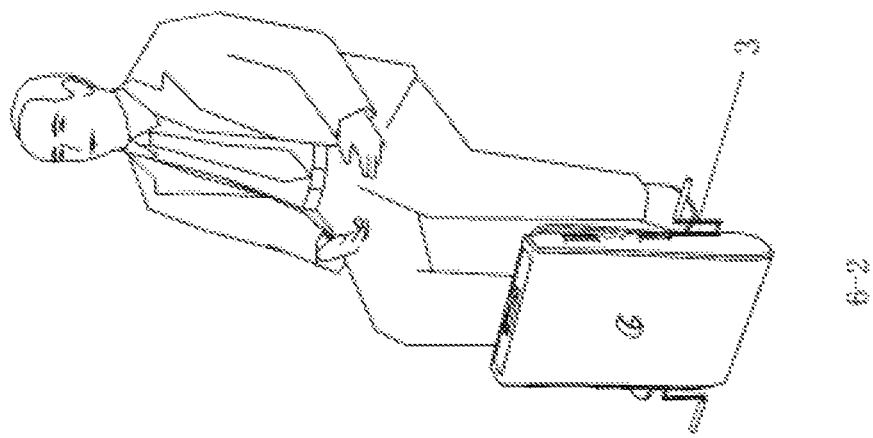
FIG. 6 (including sub-FIGS. 6-1 and 6-2) demonstrates schematically an application of the manpower generator for the portable energy-saving and environment-friendly electric vehicle of FIG. 1.
Figure 6:
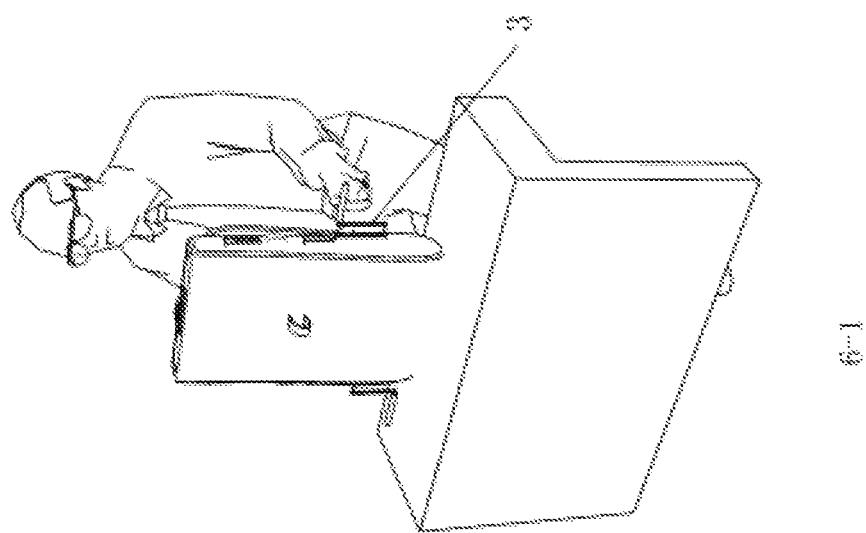

As shown in FIG. 6, while the electric charging is infeasible, or in the consideration of energy saving or exercise, the two crank handles 3 pulled out from the respective lateral sides of the backpack can be used to charge the battery set through the generator. As shown in sub-FIG. 6-1, while in charging the battery set via hand power, the backpack can be arranged on a table. On the other hand, as shown in sub-FIG. 6-2, while in charging the battery set via foot power, the backpack can be arranged on the ground. Thus, the objects in charging the battery set and exercise can be obtained simultaneously. Namely, with such a backpack at hand, the situation of power out for mobile phones or notebook computers would be never met at any place or any time.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A portable electric vehicle system, comprising:
   a backpack;
   a driving skateboard;
   a driven skateboard;

a positioning hole in said driving skateboard, securely attaching a detachable telescoping rod when said detachable telescoping rod is plugged into said positioning hole; and an electric motor;

wherein said detachable telescoping rod provides a power connection from a battery set in said backpack to said electric motor;

wherein said electric motor is attached to said driving skateboard and drives said driving skateboard; and wherein said driving skateboard and said driven skateboard are securely attached to an exterior of said backpack when not in use.

2. The portable electric vehicle system of claim 1, wherein the battery set comprises a primary battery stored in said backpack for powering said electric motor.

3. The portable electric vehicle system of claim 2, further comprising:

a back-up battery stored in said backpack; and a display for displaying charging status for said primary battery and said backup battery.

4. The portable electric vehicle system of claim 2, further comprising:

a crank-handle generator stored in said backpack and for recharging said primary battery.

5. The portable electric vehicle system of claim 4, wherein said crank-handle generator functions as a power source and an exercise mechanism, said crank-handle generator includes plural crank handles, and said crank handles protrude from said backpack to be operated by hands or feet.

6. The portable electric vehicle system of claim 1, further comprising:

wherein said detachable telescoping rod is a first telescoped supporting rod with a handle, said first telescoped supporting rod attached to said at least one positioning hole in the driving skateboard, and said handle controls a speed of said driving skateboard.

7. The portable electric vehicle system of claim 6, further comprising:

a power cable positioned within said first telescoped supporting rod for connecting said electric motor to a battery in said backpack.

8. The portable electric vehicle system of claim 7, wherein said power cable is further positioned within a sleeve of said user for connecting to said battery.

9. The portable electric vehicle system of claim 1, further comprising:

an expansion link connecting said driving skateboard and said driven skateboard, wherein said expansion link adjusts a connecting position between said driving skateboard and said driven skateboard.

10. The portable electric vehicle system of claim 1, wherein said driving skateboard and said driven skateboard each have three rollers.

11. The portable electric vehicle system of claim 10, wherein said three rollers comprise a single front roller and a pair of rear rollers.

12. The portable electric vehicle system of claim 11, wherein said single front rollers of said driven skateboard is driven by said electric motor.

13. The portable electric vehicle system of claim 11, wherein said pair or rear rollers of said driven skateboard are driven by said electric motor.

14. The portable electric vehicle system of claim 4, wherein said batteries and said crank-handle generator are integrated into said backpack.

15. A portable electric vehicle system, comprising: a backpack; a first skateboard with a first connecting location and a second connecting location; a second skateboard; wherein said expansion link connects said first skateboard and said second skateboard via said first connecting location to form a first position, said expansion link connects said first skateboard and said second skateboard via said second connecting location to forma second position, and said first position and said second position are different.

16. The portable electric vehicle system of claim 15, wherein said expansion link remains perpendicular to said first skateboard and said second skateboard.

17. The portable electric vehicle system of claim 15, wherein said expansion link is extendable for adjusting a distance between said first skateboard and said second skateboard.

* * * * *